June 17, 1958  R. T. TOWNSEND  2,839,113
BACON CONVERTER
Filed Nov. 14, 1955  4 Sheets-Sheet 2
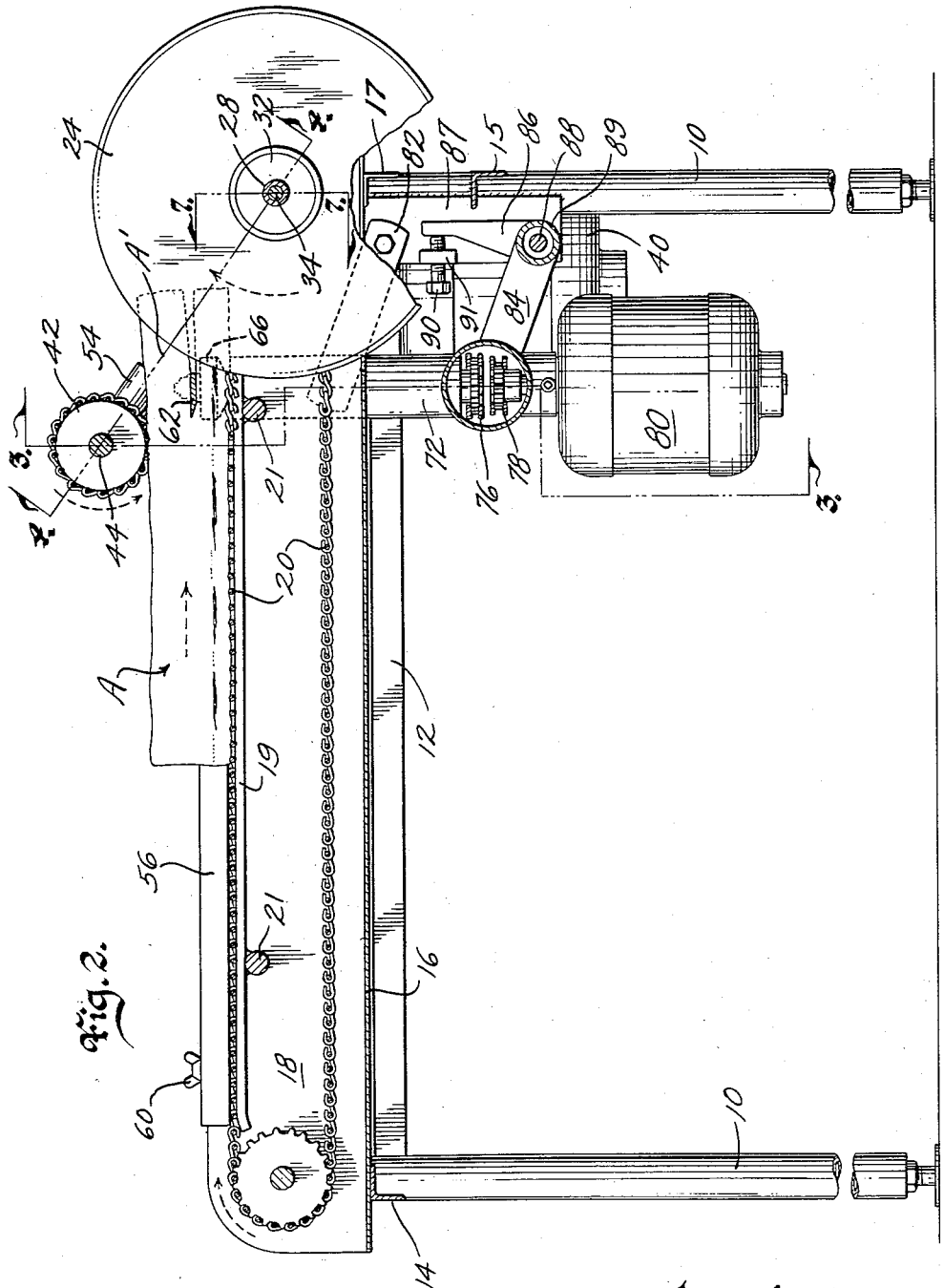
Inventor
Ray T. Townsend
by Bair, Freeman & Molinare
Attorneys

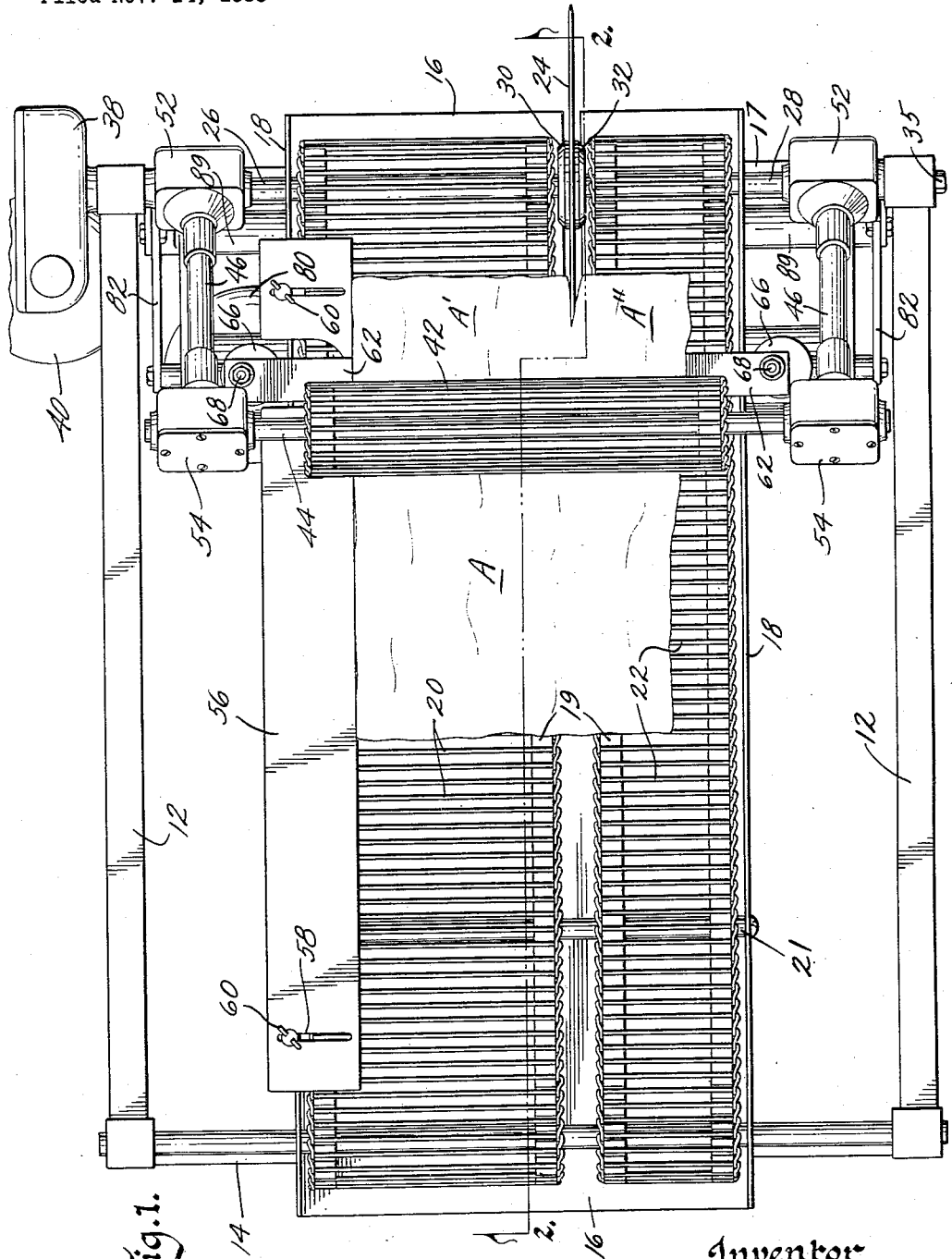

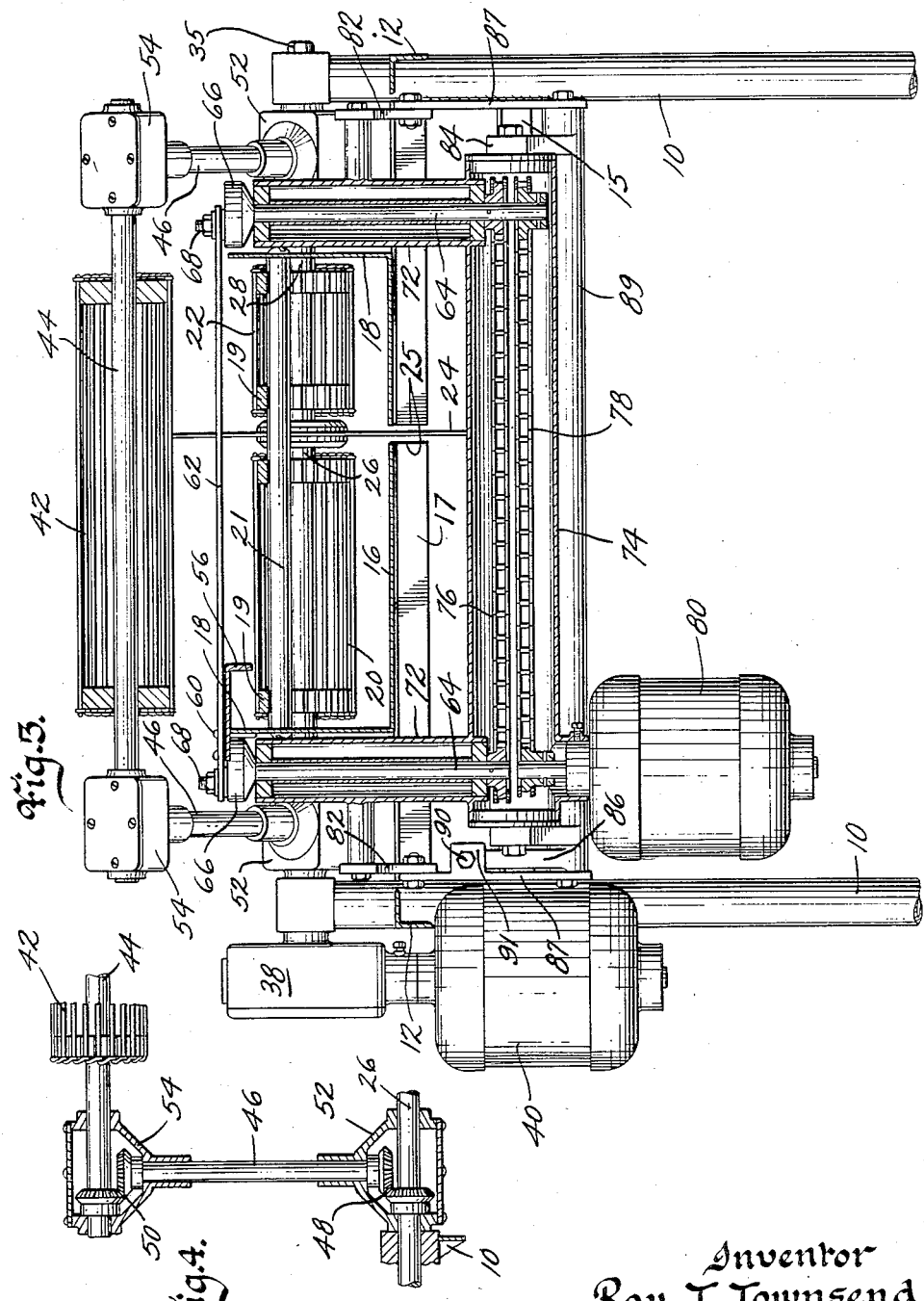

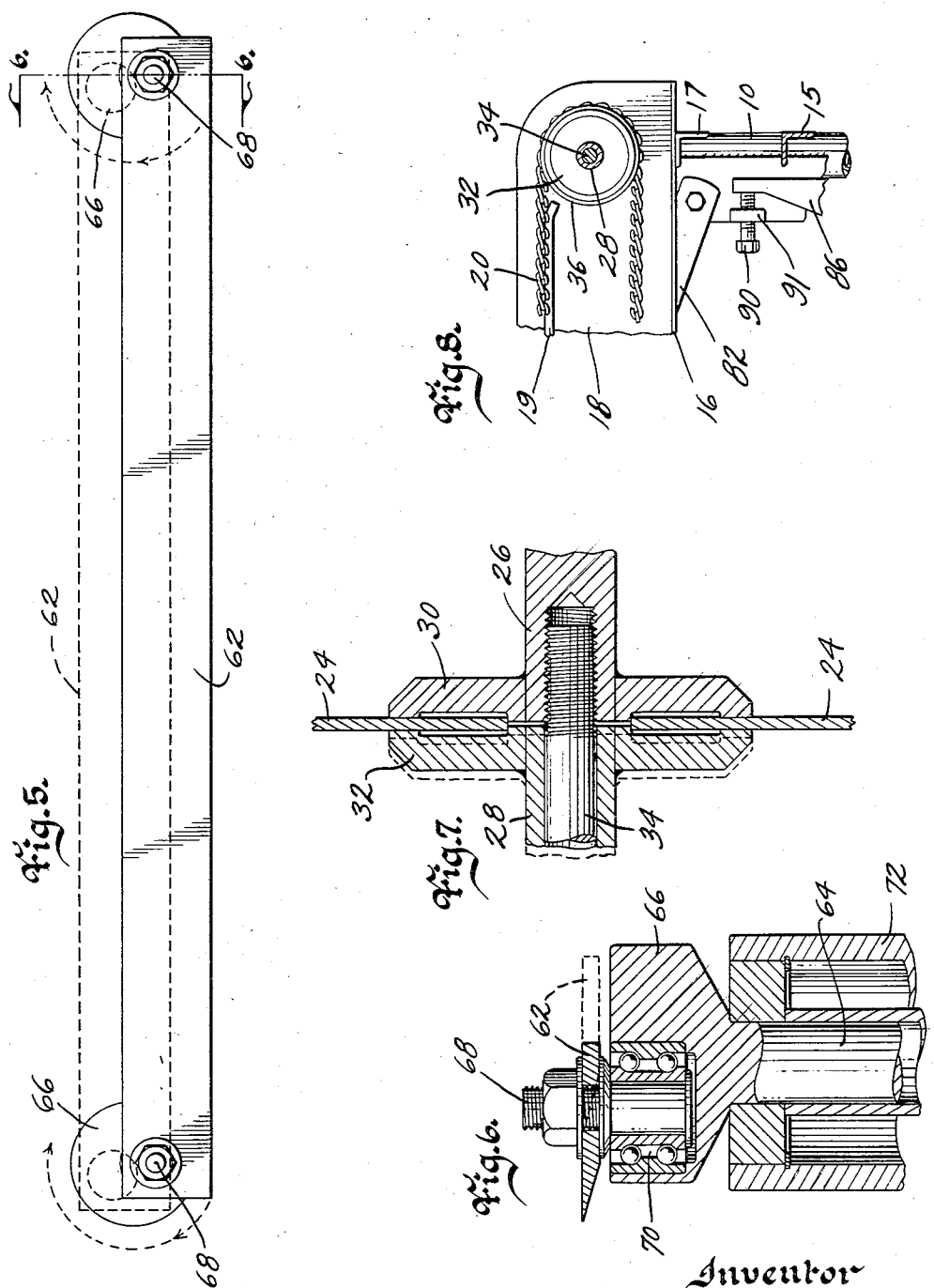

2,839,113

BACON CONVERTER

Ray T. Townsend, Des Moines, Iowa, assignor to Townsend Engineering Company, Des Moines, Iowa, a corporation of Iowa Application November 14, 1955, Serial No. 546,433

3 Claims. (Cl. 146—78)

This invention relates to a machine for converting unusually fat pork bellies to bacon slabs of uniform width and thickness with a normal amount of fat so that they can be processed into high grade bacon.

One object of the invention is to provide a machine having a conveyor arrangement on which the bellies can be deposited skin-side-down whereupon they are automatically advanced past a horizontal knife assembly by a pressure roll in opposition to the conveyor, and also past a circular knife in the vertical plane whereby the excess fat is trimmed from the belly and it is also trimmed to a uniform width.

Another object is to provide power means for driving the conveyor, the pressure roll and the horizontal and circular knives so that the entire operation requires no more attention from the operator than the placing of the bellies on the conveyor and providing means to remove the off-coming slabs and the excess fat trimmings from the machine.

Still another object is to provide a horizontal knife with an orbital action so that it may effectively cut the fat of a belly before the resulting slab of uniform width and thickness is processed into bacon. At this time the meat is relatively soft and difficult to cut and I have found that imparting a rapid orbital action to the knife makes possible the desired trimming action.

A further object is to provide height adjustment for the horizontal knife to regulate the thickness of the trimmed slab.

Still a further object is to provide means for adjusting the width of the trimmed slab.

Additional objects are to provide a conveyor arrangement which is split so as to accommodate the circular knife, a construction which permits removing the circular knife for sharpening and a machine which may be produced economically.

With these and other objects in view, my invention consists in the construction, arrangement, and combination of the various parts of my bacon converter, whereby the objects above contemplated are attained, as hereinafter more fully set forth, pointed out in my claims and illustrated in detail on the accompanying drawings.

In said drawings:

Fig. 1 is a plan view of a bacon converter embodying my invention;

Fig. 2 is a vertical sectional view with part broken away thereof on the line 2—2 of Fig. 1;

Fig. 3 is a vertical sectional view on the line 3—3 of Fig. 2;

Fig. 4 is a sectional view on the line 4—4 of Fig. 2 showing a drive arrangement for the pressure roll of my machine;

Fig. 5 is an enlarged plan view of the horizontal knife to illustrate the orbital action thereof;

Fig. 6 is a further enlarged vertical sectional view on the line 6—6 of Fig. 5 to show how one end of the knife is supported for orbital action;

Fig. 7 is an enlarged vertical sectional view on the line 7—7 of Fig. 2 to illustrate removability of the circular knife; and Fig. 8 is a sectional view similar to a portion of Fig. 2 showing a washer substituted for the circular knife.

On the accompanying drawings, I have used the reference numeral 10 to indicate supporting legs, four of which are provided. A pair of side members 12 and end members 14 and 15 form a frame connecting the upper ends of the legs together. A third end member 17 is also provided which has a slot 25 therein for a rotary circular knife 24 as shown in Fig. 3. A channel-shaped trough having a bottom 16 and side flanges 18 is supported on the frame members 14 and 17. A conveyor for the pork bellies (one of which is illustrated at A) is provided and is formed of two sections 20 and 22 so that an open space between them accommodates the circular knife 24.

The conveyor 20 is driven by a shaft 26, and a shaft 28 for driving the conveyor 22 is connected thereto by a screw 34 (see Fig. 7) the head of which is shown at 35 in Figs. 1 and 3. The conveyors 20 and 22 travel on supporting bars 19 which in turn are supported on cross rods 21 extending between the sides 18 of the trough 16—18.

The shafts 26 and 28 as shown in Fig. 7 are provided with flanges 30 and 32 respectively to engage opposite sides of the circular knife 24 for supporting and driving it. This knife is removable by removing the screw 34 and then backing off the flange 32 as to the dotted position shown in Fig. 7 so that the knife 24 may be disengaged from the hubs of the flanges 30 and 32 and then withdrawn from between the flanges and thus removed for sharpening or for replacement by a washer 36 as shown in Fig. 8 in case there is to be no width trimming of the slab A. The shaft 26 is driven by worm gearing in a housing 38, an electric motor 40 being shown for driving the worm gearing.

A pressure roll 42 is provided, supported on a shaft 44 and driven by a shaft 46 from the shaft 26. Miter gears 48 and 50 are provided as an operative connection between the shaft 26 and the shaft 46 and between the shaft 46 and the shaft 44 respectively. The miter gears 48 and 50 are contained in housings 52 and 54, the arrangement being such that the housings 52 can rotate on the shaft 26 so that the pressure roll 42 engages the slab A by gravity.

A gauge plate 56 is provided which is made adjustable by means of slots 58 therein and wing screws 60 so as to gauge the width of the slab A to be cut by the rotary knife 24 as will be obvious by an inspection of Fig. 1.

Referring to Fig. 2, a horizontal blade-type knife 62 is provided and it is preferably given an orbital motion. This may be accomplished by providing a pair of vertical shafts 64 with crank discs 66 at their upper ends having crank pins 68 carrying the blade 62. As shown in Fig. 6, ball bearings 70 may be provided for journalling the crank pins 68 in the crank discs 66.

The vertical shafts 64 are journalled, each in a tube 72. The tubes are connected together at their lower ends by a third tube 74. A chain 76 on sprockets of the shafts 64 synchronizes their rotation, and a second chain 78 may be provided as an operative connection between the shaft of an electric motor 80 and one of the vertical shafts 64 (see Fig. 3). This arrangement provides a unit comprising the blade 62, the tubes 72, the tube 74 and the motor 80 which may be vertically adjusted if mounted on parallelogram links 82 and 84 as shown in Fig. 2. The links 84 and an arm 86 are all three welded to a tube 89 rotatable about shaft 88. A set screw 90 is provided to adjust the angle of the arm 86 which rocks the tube 89 to adjust the angle of the arms 84 and thereby the spacing of the blade 62 above the conveyor 20—22. The arms 82 are pivotally supported on vertical frame plates 87 and the set screw 90 is threaded through a lug 91 on one of the plates 87. The shaft 88 is also supported by the plates 87.

PRACTICAL OPERATION

In the operation of my bacon converter, the slab A is placed on the conveyor 20—22 at the left end of the machine in Fig. 1 (the direction of travel of the conveyor being toward the right) and against the gauge plate 56. The travel of the conveyor causes the slab A to travel toward and be engaged by the pressure roll 42 which then holds the slab down against the conveyor 20—22 during the cutting of the excess fat (A' in Fig. 2) from the slab A. Uncured bellies are rather difficult to trim with a stationary knife due to the softness of the material as it engages the knife. By imparting to the knife orbital action resulting from rotation of the shafts 64, I have found the knife very effective in cutting through the fat as the slab A is advanced.

As the slab A engages and passes the rotating circular knife 24, the excess width indicated as A" as in Fig. 1 is trimmed so that a desired width of the resulting slab is had which may be determined by the setting of the gauge plate 56 in an obvious manner. A second operator may be stationed at the right hand end of the machine to dispose of the trimmed slabs to be cured into bacon and the excess fat strips A' and A" or take-away conveyors can be provided for automatically performing this operation.

In all positions of adjustment of the knife 62, the pressure roll 42 is closely thereadjacent regardless of whether the slab is thick or thin, and by permitting the pressure roll to swing about the axis of the shafts 26 and 28, it is maintained relatively close to the circular knife 24 also for proper feeding action with respect to both knives 62 and 24. The few inches of remaining slab not gripped between the conveyor 20 and the feed roll 42 as the slab passes out from under the feed roll, is readily taken care of by the next slab coming into position, advancing under the feed roll and pushing the previous slab on past the knives.

Some changes may be made in the construction and arrangement of the parts of my bacon converter without departing from the real spirit and purpose of my invention. It is, therefore, my intention to cover by my claims such modified forms of structure or use of mechanical equivalents as may reasonably be included within their scope.

I claim as my invention:

1. In a meat cutting machine of the character disclosed, a frame, a conveyor on said frame for advancing a meat slab along the frame, hold-down means on said frame opposing said conveyor, means for cutting excess fat from said slab as it is advanced by said conveyor on said frame and thereby reducing the thickness thereof comprising a knife blade located intermediate the ends of said conveyor and on the downstream side from said hold-down means, a pair of crankshafts adjacent opposite sides of said conveyor, said knife blade being carried by the cranks of said crankshafts and spanning said conveyor, and means for rotating said crankshafts in the same direction and in synchronism with each other to impart to said knife blade as a whole orbital movement in a plane spaced from and substantially parallel to that surface of said conveyor which supports the meat slab.

2. In a machine of the character disclosed, a frame, means for advancing a slab of meat along said frame comprising a conveyor and a pressure roll on said frame opposing said conveyor, means for cutting excess fat from one face of said slab and thereby reducing the thickness thereof comprising a knife blade located on the downstream side of said conveyor from said pressure roll, supported on said frame in a plane parallel to and spaced from said conveyor, means for imparting orbital movement to said knife blade as a whole in said plane, and means for cutting excess fat from one marginal side of said slab and thereby reducing the width thereof comprising a disc-shaped knife located on the downstream side of said conveyor from said pressure roll and arranged at substantially the right angles to said first knife blade, said disc-shaped knife being carried by the downstream shaft of said conveyor and being of greater diameter than the portion of the conveyor passing around said shaft, and said conveyor being formed in two sections, one on each side of said disc-shaped knife.

3. In a machine of the character described, a main frame, means for advancing an article along said main frame comprising a substantially horizontal conveyor, means for cutting the article to a desired thickness comprising a knife blade, means for mounting said knife blade for orbital movement in a horizontal plane substantially parallel to the article engaging surface of said conveyor, a supporting unit for said knife blade comprising a sub frame, a pair of vertical crankshafts journalled therein and extending past opposite sides of said conveyor, said knife blade being supported on the cranks thereof, means supported on said sub frame for driving said crankshafts rotationally in the same direction and in synchronism, upper and lower parallelogram links for supporting said sub frame on said main frame for vertical adjustment of said knife blade relative to said conveyor, means to retain the adjustment thereof, said sub frame comprising a cross member and a pair of uprights, said crankshafts being journalled in said uprights, and means to cut said article to a desired width comprising a rotary knife substantially normal to said conveyor and mounted on the downstream shaft thereof, said rotary knife being of greater diameter than the portion of the conveyor surrounding said shaft, and said conveyor being formed in two sections on opposite sides of said rotary knife.

References Cited in the file of this patent

UNITED STATES PATENTS

| | | |
|---|---|---|
| 49,478 | Mahel | Aug. 15, 1865 |
| 554,037 | Shelley | Feb. 4, 1896 |
| 1,032,055 | Ferren | July 9, 1912 |
| 1,179,836 | Johnson | Apr. 18, 1916 |
| 1,474,871 | Wessale | Nov. 20, 1923 |
| 1,485,403 | Macdonald et al. | Mar. 4, 1924 |
| 1,703,217 | Watson | Feb. 26, 1929 |
| 1,736,992 | Anderson | Nov. 26, 1929 |
| 1,950,729 | Johnson | Mar. 13, 1934 |
| 2,669,269 | Schmidt | Feb. 16, 1954 |